Figure 1:
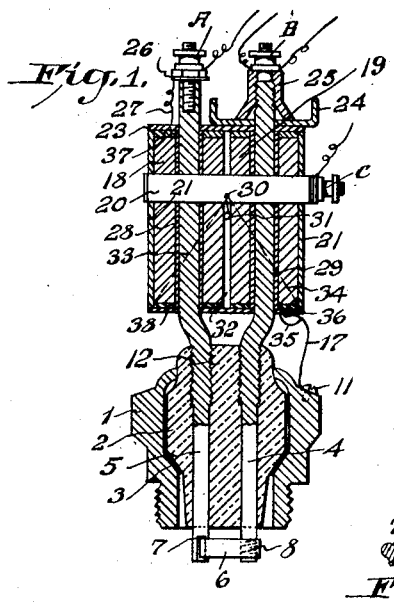

G. H. TILESTON.
ELECTROMAGNETIC IGNITER.
APPLICATION FILED JUNE 23, 1919.

1,389,280.

Patented Aug. 30, 1921.

3 SHEETS—SHEET 1.

Inventor:
George H. Tileston

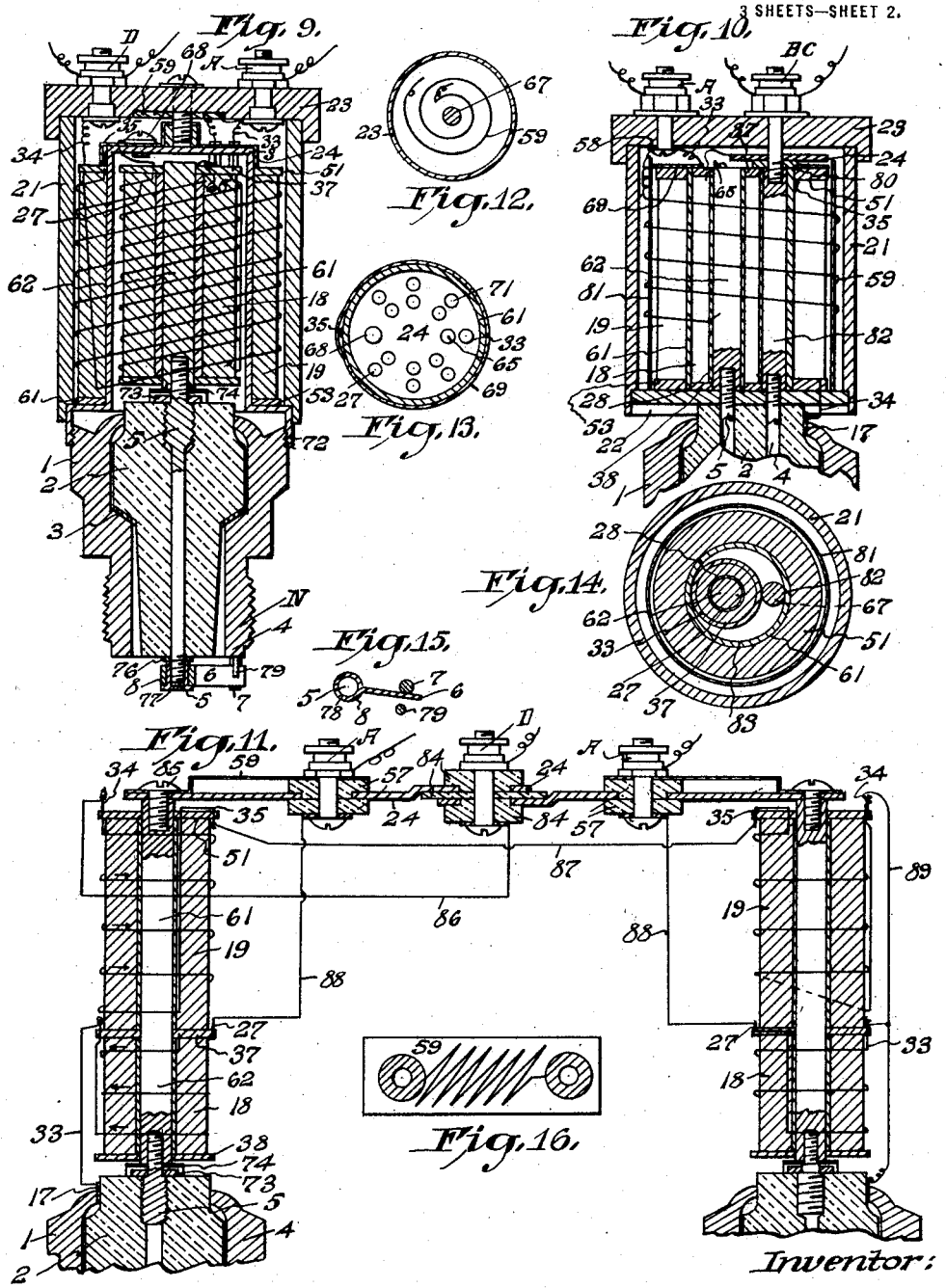

G. H. TILESTON.
ELECTROMAGNETIC IGNITER.
APPLICATION FILED JUNE 23, 1919.
1,389,280.
Patented Aug. 30, 1921.
3 SHEETS—SHEET 3.
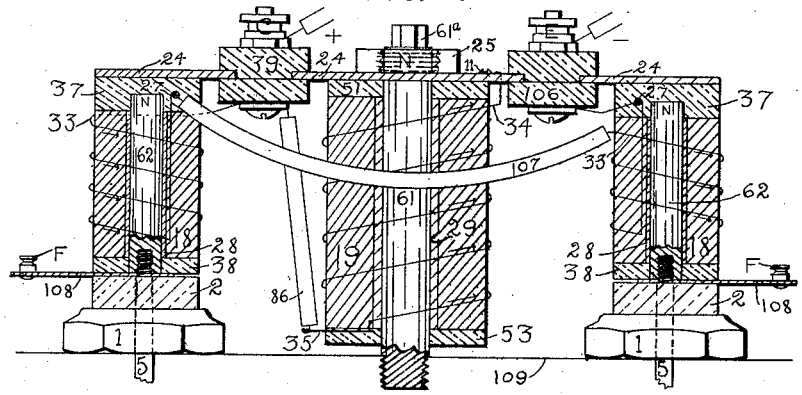
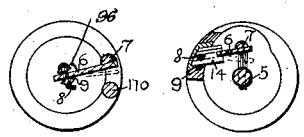
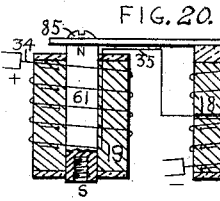
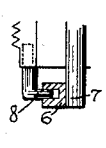
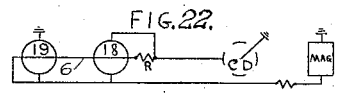
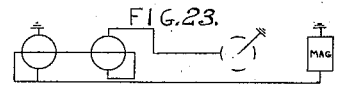
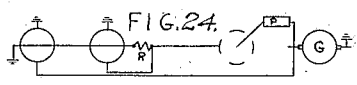
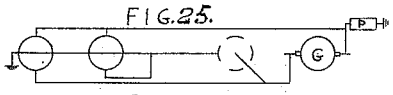
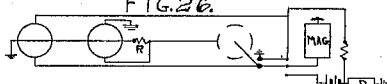
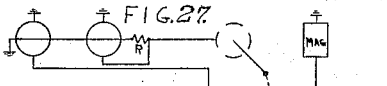
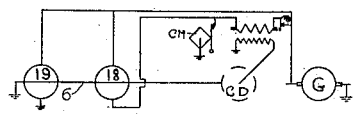
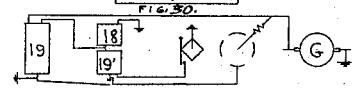
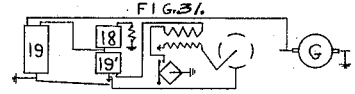
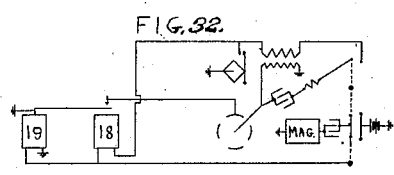
WITNESS:
A. A. Stace
Mary J. Stace
INVENTOR.
George H. Tileston.
BY
ATTORNEY.

UNITED STATES PATENT OFFICE.

GEORGE H. TILESTON, OF CHICAGO, ILLINOIS.

ELECTROMAGNETIC IGNITER.

1,389,280.   Specification of Letters Patent.   Patented Aug. 30, 1921.

Application filed June 23, 1919. Serial No. 306,214.

*To all whom it may concern:*

Be it known that I, GEORGE H. TILESTON, a citizen of the United States, residing at Chicago, in the county of Cook and State of Illinois, have invented a certain new and useful Improvement in an Electromagnetic Igniter, of which the following is a specification, reference being had to the drawings accompanying and forming part of the same.

My invention relates to improvements in electromagnetic igniter or sparking devices especially adapted for use in connection with gas engines of automobiles and the like, and has for its object the provision of such an igniter which will avoid certain defects hereinafter pointed out, and to provide accurate and practicable means by which to use make and break form of ignition in multi-cylinder internal combustion engines, more especially for use in automobile engines. For example, the construction of the igniter must provide for a relatively thick insulating core free from all joints and chambers; and all insulating requirements, as adopted in standard spark plug manufacture, must be provided for, and none of them abridged. Also the movable electrode must be relatively small, and must operate directly, as against being operated by armatures or other indirect means within the combustion chamber or any portion thereof. A further object of my invention is to substantially eliminate all mechanical operation of the igniter. A further object is to provide full insulation to the escape of heat and gases through the plug. It will be observed that in electromagnetic igniters where one magnet is employed to pull against the pulling strength of another magnet synchronism is destroyed: in such an igniter the accumulative effect of the holding magnet's magnetism permeating the armature not only acts to retard the pulling strength of the actuating magnet, but, further, the accumulated magnetism upon the armature or armatures is a variable quantity, due to the conflicting magnetic currents, the effect of which is to destroy all possibility of synchronism between the distributer and the igniting spark. Accordingly, I have constructed an igniting device introducing therein the principle of magnetic repulsion, wherein all retarding elements are eliminated and wherein positive, direct and unencumbered actuation is insured by providing a holding magnet, a repelling magnet and an armature in series with the poles thereof.

With the foregoing and other objects in view which will appear as the description proceeds, the invention resides in the combination and arrangement of parts and in the details of construction hereinafter described and claimed.

The invention is illustrated in the accompanying drawings, wherein:—

Figures 1, 2, 3, 4, 9, 10, 11 and 17 are modified embodiments of an igniting device constructed in accordance with my invention and are vertical views, portions being shown in elevation. Figs. 5, 6 and 7 are cross sections taken on the lines T of Fig. 1, U of Fig. 2 and V of Fig. 3 respectively. Fig. 8 is a longitudinal section taken on the line S—S of Fig. 3. Fig. 12 is a cross section of the resistance unit in Fig. 9. Figs. 13 and 15 are cross sections taken on the lines W and Y respectively of Fig. 9. Fig. 14 is a cross section taken on the line X of Fig. 10. Fig. 16 is a cross section of the resistance unit in Fig. 11. Figs. 18, 19 and 21 are modifications of my magnetic movable contact armature keeper, Figs. 18 and 19 being sectional views and Fig. 21 a vertical view. Fig. 20 is a diagrammatic view showing a modification in the magnet windings. Figs. 22 to 32 inclusive are diagrams illustrating generally the electrical relation of the parts.

Throughout the several figures of the drawing I have indicated similar parts by the same character of reference.

Considering the invention in greater detail, Fig. 1 shows one embodiment of my invention, and consists of a plug 1, an insulating core 2 and a gasket 3. Running through the insulating core 2 are a pair of metal stems or cores 5 and 4 of magnetizable material, upon the upward extensions of which are mounted two solenoids 18 and 19 respectively, the solenoids being preferably detachable, the insulating fiber shells 28 and 29 slipping onto the magnetic cores 5 and 4 respectively; the upward extremity of the solenoids preferably having an iron yoke 24 to conduct the magnetic current across the upward poles of the formed magnet, the yoke being electrically insulated from one of the stems. At the lower extremity of the stems within the combustion chamber of the engine a magnetic movable contact armature-keeper 6 made of iron, steel, cobalt, meteor metal or any combination of these metals or with nickel in combination extends across the poles 5 and 4 of the new formed magnet, the said armature-keeper pivoted by the pivot hinge 8 upon the stem or pole extension 4 and constituting a movable electrode. A pinched-out portion 7 forms a stationary contact upon the stem 5. A limiting post 9, as shown in Fig. 5, limits the movement of the movable electrode 6 as it travels away from the stem 5. The stems or magnet core extensions 5 and 4 serve as electrodes to carry the spark current to the movable contact 6 and are provided with binding screws A and B respectively. The windings of the solenoids 18 and 19 are wound alike as regards direction and are preferably of different magnetizing strengths, but may be of the same strength, the outside wires 33 and 34 of the solenoids 18 and 19 respectively passing through a hole 31 in the outside casing 21 which contains the two solenoids. The said wires are soldered at 30 to a metal band 20, upon which is a binding screw C. The solenoid 19 and its core 4 with the armature-keeper 6 and the yoke 24 in conjunction with the core 5 constitutes the holding magnet. The solenoid 18 and its core 5 constitutes, upon energization of the solenoid 18, the repelling magnet. The inside wire 27 of the repelling solenoid 18 is shown as connecting with the terminal post A, and the inside wire 35 of the holding solenoid 19 is shown as connecting with a grounding lead 17 which connects with the plug by the screw 11. 26 is a metal washer connecting with the wire 27. 25 is a non-magnetic clamp which secures and holds solid the yoke 24 and the solenoids, the yoke 24 pressing tightly against the upper or top inclosing member 23. The yoke 24 may have position upon the core 5 instead of upon the core 4. The lower or bottom inclosing member 22 is held firmly by pressure against the receding or bent portions of the stems 5 and 4. 37 is the upper fiber end piece to the solenoid 18, 38 being the lower end piece. An allowance space between the solenoids is shown as at 32. 12 shows the stems as being threaded through the insulating core 2. 36 is a rivet securing the grounding strip 17 to the base 22. 28 shows insulating fiber shell upon which the solenoid 18 is wound and 29 the fiber shell upon which solenoid 19 is wound. The terminal screw A is shown as feeding the repelling solenoid 18 and the repelling electrode 5, the said terminal having connection with a point on the distributing commutator. The terminal B is shown as feeding the holding electrode core 4 and the movable electrode 6 pivoted thereto, terminal B having constant connection with one terminal of the ignition current source, the said terminal being in common with corresponding terminals on the other spark plugs upon the engine. The terminal C being also a common terminal with the other plugs and having constant connection with (as in this modification of the invention) one pole of a current source designed to feed a wire of each solenoid. The current feeding the solenoids may be either direct or alternating.

Figure 2:
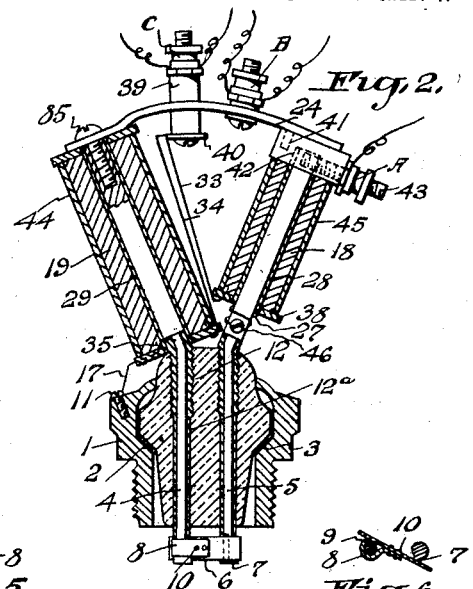

Fig. 2 is an embodiment of my invention wherein similar numerals refer to similar or corresponding parts shown in Fig. 1, and with modifications in design and construction as covered by my claims. The movable contact-armature-keeper 6 is a straight member, the pivot-hinge 8 being a separate piece and preferably of non-magnetic metal, the two members joined by the rivets 10. A sheathing or casing $12^a$ of hard metal such as nickel alloy is secured to the magnet core electrode extensions 4 and 5 respectively. The purpose of the casing is to permit the extended cores 4 and 5 to be made of soft iron by affording protection to the cores against deterioration effects. The magnetic cores 4 and 5 may be made of a magnetizable alloy, in which case the sheathing may be omitted. The iron yoke cross-piece 24 takes the form as shown and is secured to the holding magnet core 4 by the screw 85 and electrically insulated from the repelling magnet core 5 by an enlarged fiber end piece 37 and held firmly with the said end piece by the wire member 41, the wire member being secured to the yoke 24. The common terminals B and C are mounted upon the yoke 24, the post C being insulated therefrom by the insulation 39. The screw 43 of the terminal post A—which connects with the distributing commutator—passes through the fiber end piece 37 and screws into the repelling electrode magnet core 5 which terminates at 42 inside the insulation 37. 40 is a metal washer to which the solenoid wires 33 and 34 connect. 44 is a separate casing containing the holding solenoid 19 and 45 is a separate casing containing the repelling solenoid 18. The inside wire 27 of the repelling solenoid 18 has connection with the terminal post A through the screw 46 and the magnet core 5 within the solenoid 18. The solenoids with their hollow fiber insulating shells 29 and 28 are detachable from the magnetic electrodes 4 and 5 respectively.

Figure 3:
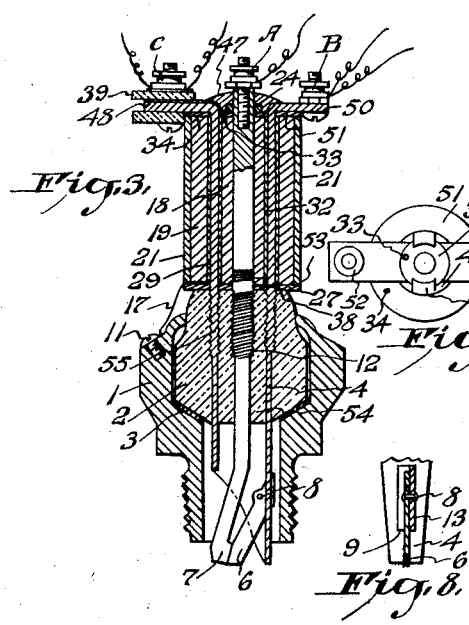

Fig. 3 is an embodiment of my invention wherein the holding solenoid 19 surrounds the repelling solenoid 18 and, correspondingly, the extended core 4 takes the form of a shell and surrounds the core 5, being insulated from the core 5 by the insulation 54. The core shell 4 is threaded outwardly as at 55 and inwardly as at 56 to insure tight fit with the insulations 2 and 54 respectively. The shell 4 may be enlarged or widened above the plug upon leaving the insulation 2. The repelling solenoid 18 is wound upon the magnet core electrode extension 5 and the inside wire is secured to the core as at 27, the outside wire 33 passing through the upper fiber end piece 37 and connecting with the binding screw C. A space as at 32 is provided between the solenoid 18 and the shell core 4 of the solenoid 19. The solenoid 19 is either secured to or slipped onto its core 4. The inner wire of the holding solenoid grounds as at 17 and the outer wire 34 passes through the fiber end piece 51 of the solenoid 19 and connects with the terminal screw C. The terminal screw A, which has connection with a point on the distributer commutator, is integral with the repelling core electrode 5, and the common terminal posts B and C are mounted upon angled extensions 50 of the shell core 4, the post C being insulated therefrom by the insulation 39 and, as in Fig. 7, the insulation 52. An insulating strip 48 protects the wires 33 and 34 from contact with the angle extension 50. The iron yoke 24 is in this modification an angled extension of the shell core 4 and extends into proximity with the repelling core 5. A hot-poured insulation 47 incloses the exposed parts and the inside solenoid and electrically insulates the parts against deterioration. 37 and 38 are respectively the top and bottom fiber end pieces to the solenoid 18, and 51 and 53 are respectively the top and bottom fiber end pieces to the solenoid 19. The repelling electrode core 5 bends within the combustion chamber as shown. The movable contact armature 6 pivots as at 8 to an extension 13 of the shell core electrode 4. The limiting post 9 is a part of the shell 4 and takes the form as shown and is the remaining lower edge obtained by bending at an angle the abutment 13.

Figure 4:
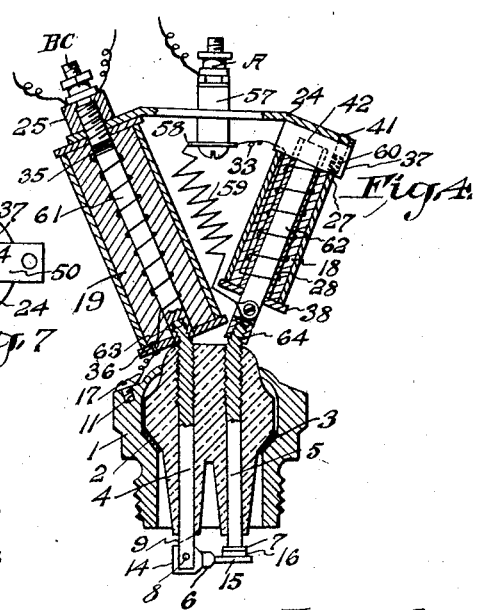

Fig. 4 is an embodiment of my invention introducing means for operation requiring only one extra wire wherein the resistance unit 59 shunts or divides the current as between the repelling magnet and the ignition circuit, the purpose being to provide for flow of current through the repelling magnet, as in this modification only one source of current is employed to feed the magnets and the ignition circuit as shown by the combining of the terminals B and C, and hence, without the resistance unit the spark electrode cores 4 and 5 and the armature 6 would constitute a short circuit across the repelling solenoid 18 during the time the distributer is giving the terminal A a return circuit—to the detriment of the proper operation of the igniter. It is apparent that the placing of a resistance unit in the circuit between the terminal A and the ground on the distributing commutator could not of itself protect the repelling magnet 18 against the shorter route of the current through the closed armature. And therefore my resistance unit which must be upon the plug to be effective, and taken in conjunction with the repelling magnet constitutes a part of the invention as claimed. Fig. 4 shows the courses of the current through the solenoids, as well as through the other members. The terminals B and C are combined. The current enters BC, feeds the inner wire 35 of the holding solenoid 19 shown attached to the core 4, feeds the yoke 24 and passes through the member 41 extending from the yoke and feeds the wire spring connector 60 which is attached inside the fiber end piece 37 to the inner wire 27 of the repelling solenoid 18, and feeds the movable contact armature 6 through the magnetic electrode 4. The holding solenoid winding has return circuit through its outer wire end 34, through the rivet 36 and through the grounding wire 17 to the ground 11. The repelling magnet has return circuit directly through its outer wire end 33 to the terminal A, through the distributer commutator and to the ground. The ignition circuit has return circuit from the movable contact 6 through the magnetic electrode 5, through the connecter 65 secured by the screw 66, through the resistance unit 59, the metal washer 58 to the terminal A and thence to the ground through the distributer. The movable contact armature keeper 6 is made from a wire shown at 6, flattened at both its ends as at 14 and 15, the latter end showing cross section, and is provided with a contact point 16. The electrode 4 has a longitudinal cut, the armature part 14 fitting into same. The armature moves upon the cotter pin pivot 8. The limit of the cut in core 4 as at 9 limits the movement of the armature. A wire 96 made of tungsten or other metal may connect the armature with its supporting electrode to insure electrical circuit through the armature. The solenoids 19 and 18 are integral with their cores 61 and 62 respectively and the said cores screw onto the magnetic electrodes 4 and 5 at the ends 63 and 64 respectively, the electrodes 4 and 5 being of magnetic metal or a combination of magnetic metals and preferably alloyed with nickel. 57 is insulation for the terminal post A. The current passes through the holding solenoid 19 in a clock-wise direction making the yoke 24 a magnetic south pole and the armature 6 a magnetic north pole, the two poles being magnetically joined by the electrode 5 and the core 62. The current is distributed at intervals through the winding 18 and its course is also clock-wise with respect to the corresponding poles of both magnets. The direction of the magnetic flux in the core 5—62 acquired from the solenoid 19 is now reversed, as electric currents traveling in the same direction generate magnetic currents in the same direction: Thus the winding 18 offers south to the yoke 24 and north to the armature 6 and the continuity of the magnetic current generated by the winding 19 breaks at the contacts 7 and 16—preferably of magnetic alloy, since the armature 6 is offered north polarity from both of the solenoids and because the armature is flexibly suspended and offers no resistance to the repelling force.

Fig. 9 is an embodiment of my invention wherein the holding magnetic core 4 is combined with the shell of the plug, the latter having metallic communication with the shell core 61 of the holding magnet 19 through the joint 72. At spaced intervals the magnetic electrode 5 carries the repelling magnetic flux through the armature-keeper 6 and offers north polarity to the stationary electrode 7 which is normally north and the armature 6 repels from the contact 7 which is an extension of magnetic metal extending from the shell 1. A second member 79 of non-magnetic metal extends from the shell 1—4 in the path of the contact armature-keeper 6 and acts as a limiting post for the armature 6 and corresponds to the limiting post 9 in the foregoing figures, but with the added feature of serving as a circuit closer. Thus upon the full opening of the armature the arc of the spark current is cut out by the re-closing of the spark circuit through the said limiting post 79. A further purpose obtained by thus re-closing the ignition circuit is to relieve the repelling solenoid of the surplus current which passes through it while the ignition contacts are open. A washer 76 screws onto the magnetic electrode 5 and serves as an abutment for the armature 6 and also makes a thorough joint as between the electrode 5 and the insulating core 2. The armature 6 slips onto the magnetic or non-magnetic pivot post 78 which latter screws onto the end of the electrode 5, the said pivot post being provided with a resting base for the armature. 77 shows an allowance space between the end of electrode 5 and the base of the pivot post 78. The pivot-hinge 8 is integral with the armature 6, the armature having a hole drilled through it to form the hinge. The core 62 of the repelling solenoid 18 screws onto the magnetic core extension 5 with a gasket 73 and washer 74 provided. The iron shell core 61 is a cylinder closed at its upper end, the upper end acting as the cross-piece yoke 24 through which the inside wire 27 of the repelling solenoid 18 passes and grounds with the screw 68. A wire as at 65 attaches to the repelling magnet core 62, passes through an insulator 70, Fig. 13 and connects with the resistance unit 59. The outside wire 33 of the repelling solenoid 18 passes through an insulator 70 and connects with the terminal post A at the washer 58 to which the resistance unit is also connected. The outside wire 34 of the holding solenoid 19 connects with the terminal screw D and the inside wire grounds as at 35. An extension 75 from the yoke 24 provides for the screw 67 which holds the cover 23 to the inclosing case 21. It is understood that the inclosing case 21 may be perforated to afford air circulation. A fiber insulating cap 69 fits upon the yoke 24 and its extension 75. The yoke 24 is perforated as at 71, Fig. 13 which provides for air circulation and for the wires 65 and 33 to pass through. It is understood that either solenoid may be adapted as the holding magnet. Thus the solenoid 18 and its extended core 5 may be connected in the constant circuit and act as the holding magnet, and the solenoid 19 and its extended core 1—4 connected to act as the repelling magnet.

Fig. 10 is a modification employing the two electrodes 5 and 4 and wherein the shell core 61 of the holding solenoid 19 is in contact with and has magnetic and electric communication with a post 82 which is better shown in Fig. 14. The resistance unit 59 is wound upon the insulation 81 which is positioned around the outer solenoid 19. The outer wire of the holding solenoid 19 connects with the grounding strip 17 through a stiff wire as at 34 and the inner wire is connected to the shell core 61 as at 35, thus having electric circuit with the terminal post BC. 22 and 23 are respectively the base and top of the inclosing casing 21. 83, Fig. 14 represents the periphery or outer limits of the repelling solenoid winding 18. The inner wire of the repelling solenoid 18 connects as at 27 with the iron yoke 24, thus having electric circuit with the terminal BC. The yoke 24 is screwed to the terminal post 67 and is supported by an iron nut 80, the two forming a lock-nut, the nut 80 pressing against a portion of the shell core 61 which, in conjunction with the post 82 and the electrode 4, securely fastens the magnets and the base 22 to the insulation core 2. One wire of the resistance unit connects as at 65 with the repelling core 62. The insulating cap 69 is in the shape of a washer and protects the wires 33 and 27 from contact with the shell core 61. The binding screw BC secures the cover 23 and the inclosing casing 21 to the base 22 through the screw 67 and the post 82.

Fig. 11 illustrates an embodiment of my invention wherein the construction is simplified by connecting two plugs together, each plug being provided with a holding magnet 19 and a repelling magnet 18. The two holding magnets are connected in series, each holding magnet contributing its strength to hold the armatures. The yoke 24, instead of having direct communication with the shell of the plug as in Fig. 9, connects with the shell through the core and armature of a second plug, with the engine walls affording a return magnetic circuit. The terminal D is the common wire feeding the holding magnets 19 of each plug through the lead 86 and the series wire 87 respectively. The outer wire 34 of the holding magnet 19 of the second plug is grounded through the wire 89. The outer wires of the repelling magnets 18 are grounded as at 33. The terminals A connect respectively with their respective points on the distributing commutator. The inner wires of the repelling magnets connect with their respective terminal A. The magnetic electrode 5 of the first plug is normally south as indicated by the large and small letters S. The magnetic electrode 5 of the second plug is normally north as shown by the large and small letters N. Upon energization of the repelling solenoid 18 of the first plug the electrode 5 of the said first plug becomes north, as indicated by the small letter N, which pole thereupon repels the north polarity in the shell 1 of the said plug. It is understood that the connections may be changed about, so long as the principle remains the same. For instance, the holding solenoids may be connected in parallel instead of in series. A resistance unit 59, Fig. 16 connects with each terminal post A and with each yoke screw 85. The terminals A are insulated from the yoke 24 by the insulation 57. The terminal D is insulated by the insulation 84 and the yoke 24 is electrically broken by the insulation 84.

Fig. 17 is an embodiment of my invention wherein the holding magnet feeds magnetism to the repelling magnets of two plugs, and this is accomplished by securing one pole of the holding magnet 19 to the top of the engine frame 109 as at 4. The magnet core 61 is tapered to form a nut at 61^A which provides means for screwing the core 61 to the frame 109. The yoke 24 extends from the core 61 to the electrically insulating fiber end piece 37 of each repelling magnet 18, the yoke being secured to the core 61 by the nut 25. The magnetic circuit of the holding magnet 19 is completed equally through the cores 62 of the repelling magnets, the magnetic electrodes 5 and their respective armatures, with the engine frame affording a magnetic circuit between the core 61 and the shells of the plugs. The current is fed to the terminal C which feeds the inner wire 35 of the holding solenoid 19 through the lead 86, the outer wire 33 of the first repelling magnet directly and the outer wire 33 of the second repelling magnet through series connection with the inner wire 27 of the first repelling magnet and through the lead 107, the repelling circuit passing out at the inner wire 27 of the second repelling magnet to the terminal E which connects with either an open circuit or a closed circuit contact-maker, in the former case given a ground at timed intervals, which grounding also completes the primary winding of a coil in circuit with current supply, the higher tension secondary winding of said coil being supplied through a distributer to the terminals F— each terminal F leading to its respective point on the distributer. The two repelling coils are shown in series, but may separately be provided with a terminal return E. Diagram 28 shows these connections. The spark current—which may be of any tension— enters the terminal F, passes through the supporting member 108 which may comprise a gasket, connects with the magnetic electrode 5 and passes through the contact armature into the grounded shell of the plug. The direction of the current through the respective solenoids, as indicated by the arrows, produces north polarity at the upper end of the holding magnet 19 normally, the magnetism of the said magnet completing its circulation through the magnetic electrodes 5 and the cores 62 of the repelling solenoids 18 respectively when the open circuit contact-maker is employed, the closing of the contact-maker causing north polarity at the upper ends of the repelling magnets and south polarity at the armatures, both armatures repelling in unison if both repelling solenoids are connected in series. When a closed circuit contact-maker is used all the solenoids are normally energized and the armatures normally repelled, the armatures completing the spark circuit when repelled, as shown in Figs. 18 and 19. Upon deënergization of the repelling magnet 18 as shown in diagrams 29 and 32 the magnetism of the holding magnet 19 is no longer repulsed and the holding magnet 19 attracts the armature to break the spark circuit as in Figs. 18 and 19. The terminal E is provided with insulation 106. The grounding screw 11 has position on the yoke 24.

Fig. 18 is a modification of the magnetic movable contact-armature which comprises an important feature of my invention, and wherein the armature 6 is normally repelled against a stationary contact 7 of preferably nonmagnetic metal by like polarity offered to the armature at both its ends, the armature being pivoted in the center electrode and repelled from the pole 110 which is an extension of magnetic metal from the shell, the stationary contact 7 also extending from the shell of the plug. The movement of the armature is limited by the limit-post 9 at a position shown by the dotted lines. Fig. 19 shows the normally repelled armature 6 formed of two pieces, the end 14 pivoting in a cut in an extension of the shell shown by the shading, the limit-post being a wall of the cut as at 9. A stationary contact 7 of preferably non-magnetic metal screws into the center electrode 5 and bends into lateral plane with the armature 6 as at 7. The dotted lines show the position of the armature when engaging the limit-post 9.

Fig. 20 is a modification of the winding of the holding magnet wherein the holding winding 19 has position on both the cores 61 and 62 and wherein the core 61' is normally a part of the holding magnet as in the foregoing embodiments, but in this modification the upper portion of the core, designated as 62, is eliminated as a part of the holding magnet by the neutralizing current normally passing through its winding 18, the said repelling solenoid 18 normally being in a closed circuit and offering magnetism opposing the poles of the holding magnet 19—19', and whereupon the de-energization of the winding 19' will allow the repelling solenoid 18 to repel the armature-keeper 6 as shown in diagrams 30 and 31. The current feeds the outside wire 34 of the holding solenoid 19 and passes out at the inside wire 35 and connects with the inside wire 27 of the repelling solenoid 18 and with the inside wire of the second portion of the winding of the holding magnet 19 designated as 19' and passes out from here equally at the outside wire of the said auxiliary winding 19' and the outside wire 33 of the repelling winding 18, the current thus being divided and distributed into the windings 18 and 19' which are preferably of equal strength and resistance. The purpose of the compound winding in this modification is to afford means whereby the armature as shown in Figs. 1, 2, 3, 4, 9 and 21 may be employed in conjunction with a closed-circuit repelling solenoid. The connections are shown in the diagrams 30 and 31. Fig. 21 is an embodiment of the magnetic movable contact armature wherein the magnetic armature 6 is a cylinder, closed at its contact end, and adapted to slide to and from the stationary contact 7, the armature sliding on the magnetic pivot wire 8 which extends from the plug shell.

Figs. 22 to 32 inclusive are diagrams showing the wiring connections of my invention, the holding solenoids 19 being to the left in the figures and the repelling solenoids 18 to the right. The resistance unit upon the igniter is part of my invention and provides means for making the repelling magnet 18 operable and is designated by the letter R. CD is a commutator or distributer, "MAG" is a magneto, P a primary spark coil, G a generator, CM a contact-maker. The magnetic movable contact armature-keeper 6 is designated. The wire leads, grounds, switches, batteries, high tension spark coils, condensers and other resistances are plainly identifiable and unindicated to avoid crowding. Fig. 22 shows the wiring connections using one extra wire—the feed wire—and is adaptable more especially to the embodiment of my invention as set forth in Fig. 4. Fig. 23 shows wiring for connecting the repelling solenoids in series with the armature. Fig. 24 shows connections as adaptable more especially to the embodiments set forth in Figs. 9 and 11. The primary spark coil P may be omitted. Fig. 25 illustrates a connection using two extra leads and a primary spark coil P in series only with the ignition. Fig. 26 illustrates connections using two extra leads. Magneto running and battery start through a primary coil P is provided by a double point switch and connections as shown. When the magneto is used one pole of the battery is opened and the other pole has ground through a resistance and the switch. The diagram shows the magneto in circuit. When the battery is used the magneto is given a second ground through the switch, the holding solenoid 19 is supplied through the resistance at the battery and has return through its second lead, and current through the primary coil P enters the armature 6 and the repelling solenoid 18 from ground—the resistance unit R providing for the energization of the repelling solenoid 18—, the current returning to the battery through the commutator distributer. Fig. 27 shows wiring using one extra lead and adaptable more especially to embodiments of my invention as shown in Figs. 9 and 11. Magneto and battery operation is provided through two separate switches so placed as to provide for the magneto supplying both the repelling magnet 18 and the armature 6—with its resistance unit R—directly, or supplying them through the primary coil P. The battery also uses the primary coil P through the commutator. Fig. 28 is an open-circuit wiring using a vibrating spark coil and two extra leads and is adaptable more especially to the embodiment shown in Fig. 17 and fully described under that figure. Fig. 29 is a closed-circuit wiring using a high tension, or relatively high tension spark coil and two extra leads, the diagram being fully described under Fig. 17. Fig. 30 shows wiring connections embodying the compound winding of the holding magnet 19—19' as described under Fig. 20. It is closed-circuit and normally the solenoids 18 and 19' neutralize against each other and the armature 6 is closed by the holding magnet 19—19'. The contact-maker releases the auxiliary solenoid 19' from ground and the repelling solenoid 18 is then allowed to repel the armature-keeper 6. Fig. 31 is another wiring connecting for the compound winding set forth under Fig. 20. Two extra leads are used. A high tension coil supplies the spark, the primary winding of the coil being in series with the auxiliary solenoid 19'. A resistance is inserted between the repelling solenoid 18 and the ground, but may be omitted by winding the repelling solenoid 18 to a higher resistance than the auxiliary winding 19'. The diagram shows the contact-maker opening the circuit of the auxiliary winding 19' and the primary winding of the spark coil, with the armature-keeper 6 repelling. Fig. 32 shows a closed-circuit contact-maker and armature as fully referred to under Fig. 17. Either magneto or battery operation is provided through a double lever switch and a single lever switch and the following operation may be had through the various positions of the said switches: 1—battery operates all, 2—magneto operates all, 3—battery operates magnets 19 and 18 and magneto operates primary winding of spark coil, giving relatively high tension current at spark, 4—battery operates magnets and magneto operates spark direct from magneto, giving low tension at spark, 5—magneto operates magnets and battery operates primary coil giving relatively high tension at spark. A combination of two currents of different amperages and voltages may be used for the spark, a low tension current for the first break and a high tension to jump across the gap made by the breaking of contact.

The operation of the device will be perfectly clear when, taken in conjunction with the foregoing, it is noted that upon the energization of the solenoid 18 the current passes through the solenoid in a direction to cause magnetic lines of force to impinge upon the armature 6 to repulse or repel the lines of force normally directed upon the armature from the holding solenoid 19. By this introduction of magnetic flux of the same sign at each end of the armature the armature is repelled from one of the poles offering magnetic flux to break or close the ignition circuit. When the solenoid 18 is connected in open-circuit, upon energization it will repel the armature 6 to open the spark circuit: when connected in closed-circuit it will repel the armature 6 to close the spark circuit and release the armature to open the circuit upon deënergization. The auxiliary winding 19' provides means for neutralizing the repelling force of the winding 18 when the winding 18 is connected in closed-circuit: upon deënergization of the winding 19' the winding 18 will be allowed to repel the armature 6 to open the spark circuit.

Having dispensed with springs and encumbrances of faulty insulation for heat and gases, and having dispensed with faulty mechanical and magnetic operation, it will be appreciated that my improved device which employs a magnetic movable contact directly actuated by magnetic flux; and which introduces into an igniter the principle of magnetic repulsion and employs a magnet normally to close the spark circuit and a reversing magnet, or magnet of the same polarity with respect to the magnetic movable contact, to open the spark circuit will not deteriorate under hard usage and high degrees of heat, and overcomes all the obstacles which have heretofore prevented the use of a make and break contact for automobile ignition.

Having thus described my invention, I claim as new and desire to secure by Letters Patent the following:

1. In an electro-magnetic igniter, in combination, a plug, an insulating core passing vertically through the plug, an electro-magnet mounted upon the plug, a metallic stem of magnetizable material extending through the said insulating core, said stem connecting with, or in one piece being an extension of, the core of the said electro-magnet, an armature mounted within the combustion chamber, a post limiting the movement of the armature, a second magnet normally holding the armature in closed relation with a stationary contact, and an electric current passing at intervals through the winding of the said electro-magnet in a direction whereby the same sign of polarity will be presented to the armature as that normally presented by the said second or holding magnet, and whereby the armature will be repelled at its free end to open the ignition circuit.

2. In a device of the class described, the combination with a plug, an electro-magnet and its armature, of an extended magnet core embedded in insulation material and extending through the plug and into the combustion chamber, said armature constituting a contact arm, a stationary contact; and a second magnet normally maintaining said contacts in closed relation, the aforesaid electro-magnet in series with a distributer or contact maker and wound and connected to intermittently cause a reversal of magnetic flux at the remote or free end of the said armature, whereby the armature will magnetically repel to open the sparking contacts.

3. In an electro-magnetic igniter, a holding magnet, a repelling magnet, an armature pivoted between the poles of the said magnets and having position within the combustion chamber, the holding magnet normally attracting the armature, a winding constituting a solenoid to the repelling magnet, and a circuit closer in series with the solenoid and energizing the solenoid at intervals whereby the said repelling magnet will present to the armature magnetism of the same sign as normally presented by the holding magnet to cause the armature to be repelled to open or close the sparking circuit.

4. In a device of the class described, the combination with an electro-magnet, of an armature comprising a vibratory contact arm, a stationary contact; a second magnet normally attracting the said contact armature to maintain the contacts in closed relation and means for intermittently sending a current through the first electro-magnet to cause a reversal of magnetic flux upon the remote end of the armature, whereby the armature will magnetically repel to open the sparking circuit.

5. In an electro-magnetic igniter, two magnetic poles within the combustion chamber, one of said poles normally energized, a magnetic contact-armature pivoted across the poles and normally attracted to the poles by the magnetism of the energized poles, and means for reversing the polarity of the end of the armature adjacent the normally unenergized pole whereby the armature will magnetically repel from one of the poles to break or make an ignition circuit.

6. In an electro-magnetic igniter, two magnetic poles entering the combustion chamber, a magnetic movable contact positioned across the poles, one of said poles normally magnetized and whereby the said magnetic movable contact in communication with said magnetized pole will seek and connect with the normally unenergized second pole piece and thus complete an electric and magnetic circuit, and the said second pole or electrode designed for magnetization at intervals in a manner whereby the same sign of polarity will be offered the magnetic movable contact from the said second pole piece as that offered from the first said normally magnetized pole piece, and whereby the said movable contact will be magnetically repelled to break an electric current for the purpose herein set forth.

7. In a spark plug for explosive engines, in combination, a shell, an electro-magnet upon the shell, an extended magnet core running through the shell and insulated therefrom, a movable contact-armature in communication with the said extended magnet core, a stationary contact and magnetic means for normally keeping the said armature contacting with the stationary contact, whereby the passing of an electric current through the said electro-magnet coil in a direction in opposition to the direction of the acquired magnetism of its core will magnetically repulse the armature to open the spark circuit.

8. In an electro-magnetic igniter, two magnetic poles or legs, an armature suspended across them, and electro-magnetic means for reversing the polarity in one of the magnetic poles or legs to cause the armature to magnetically repel from one of the said poles to open or close a sparking circuit.

9. In a device of the class described, in combination, a plug, a stationary contact, a magnetic movable contact-armature, a magnetic pole piece in proximity to the contact-armature and normally attracting it and holding it in closed relation with the stationary contact, a second pole piece in proximity to the contact-armature, means for normally investing the attracting pole piece with magnetic flux, and means for investing the second pole piece with magnetism opposing the direction of the magnetism of the first named magnetic pole piece, whereby the contact-armature will be magnetically repelled to intermittently open and close the sparking circuit.

10. In an electro-magnetic igniter, in combination, a plug, a holding magnet upon the plug, a repelling magnet upon the plug, an iron yoke magnetically connecting the magnets at their extremity farthest from the plug, a flexible magnetic armature pivoted upon the plug within the combustion chamber, the said holding and repelling magnets respectively having substantially metallic communication with the armature, a contact upon the armature, a stationary contact, the holding magnet normally attracting the armature and the repelling magnet offering at timed intervals to the armature a magnetic flux of the same sign or polarity as that given the armature by the holding magnet, whereby the armature will be magnetically repelled to open or close the ignition circuit.

11. In an electro-magnetic igniter, a magnet, a contacting armature suspended across the extended poles of the magnet within the combustion chamber, a winding upon one of the legs of the magnet and an electric current passing through the winding in a direction in opposition to the direction of the normal magnetism in the said leg, whereby the armature will magnetically repel from one of the poles to open or close the ignition circuit.

12. In an electro-magnetic igniter, the combination with a plug and an electro-magnet, of an armature within the cylinder of the engine, a stem of magnetizable metal carrying the magnetism of the electro-magnet into the combustion chamber and to the armature, a second magnet normally holding the armature in closed relation with a stationary contact, and an electric current passing through the winding of the said electro-magnet in opposite direction to the direction of the magnetism permeating the said second or holding magnet, whereby the same sign of magnetic polarity will be offered to the armature from each of said magnets, and whereby the armature will repel from one of the poles for the purpose herein set forth.

13. In an igniter for internal combustion engines, a projected metallic core of magnetizable material insulated and extending into the cylinder of the engine, an armature flexibly secured at or near the end of the core within the cylinder and in operative relation to said core, an energizing winding upon the core, a stationary contact member, a contact point mounted upon the armature, a holding magnet one stem or leg of which externally connects or nearly connects with the aforesaid projected metallic core, and the other leg having substantially metallic communication with the armature whereby the said metallic core and the armature will be permeated with a magnetic flux, and whereby the said armature will seek and connect with the said metallic core to close a spark circuit, and an electric current passing through the aforesaid winding in opposition to the acquired or permanent magnetism permeating the said metallic core, or in direction whereby the constant magnetism permeating the said core will be reversed, and whereby magnetic polarity of the same sign as the armature normally possesses will be presented to the armature and the armature repelled from the said core to open the spark circuit; and a resistance unit shunted across the said projected metallic core and the terminal feeding the said energizing winding to divide the current or balance the circuit as between the said winding and the contact armature.

14. In an electro-magnetic igniter, in combination, a plug, an insulating core through the plug, an electro-magnet mounted upon the plug, the core of said magnet extended and running through the said insulating core and into the combustion chamber, a casing of hard metal or alloy surrounding the said extended magnet core, a movable contact member of magnetizable metal pivoted or hinged upon the said extended magnet core within the combustion chamber, and a second magnet having metallic communication with and normally holding the said contact member to close or open the sparking circuit, whereby upon energization of the electro-magnet the extended magnet core will carry the magnetism of the magnet core through the length of the insulating core and magnetize the said contact member with the same sign of polarity as it normally receives from the said holding magnet, and whereby the contact member will magnetically repel to open or close the spark circuit; and wiring connections to adapt the igniter to various ignition systems.

15. In an electro-magnetic igniter, the combination of a center magnetic electrode, insulation surrounding the electrode, a magnetic shell electrode surrounding the said insulation, a movable contact-armature pivoted across the said electrodes within the combustion chamber, a winding upon the center electrode outside the plug, a magnet in communication with the said magnetic shell electrode and normally attracting the said movable contact-armature, and an electric current passing through the aforesaid winding whereby magnetic polarity of the same sign as the contact-armature normally possesses will be presented to the contact-armature, and whereby the contact-armature will be repelled at its free end for the purpose herein set forth.

16. In an igniter for internal combustion engines, in combination, an electro-magnet, the core of the magnet extending into proximity to the combustion chamber, a stationary contact, a movable contact member of iron, steel or other magnetizable metal or alloy pivoted in the combustion chamber and comprising an armature, an armature limiting member, a second magnet having communication with and normally attracting the movable contact member and a distributer actuating at intervals the first named magnet, whereby magnetic flux of the same polarity will be offered the armature as that normally offered the armature by the said second or attracting magnet to repel the said magnetic movable contact member to open or close the ignition circuit, and means for returning the movable contact member to its normal position.

17. In an electro-magnetic igniter, in combination, an electro-magnet, a second magnet, a magnetic electrode having communication with the combustion chamber, the core of the electro-magnet passing through the said magnetic electrode and insulated therefrom and extending into the combustion chamber and serving as an electrode, a contact-armature pivoted across the said electrodes, the said second magnet having communication with the first said magnetic electrode and normally attracting the contact-armature, and the said first named electro-magnet in circuit with a distributer, whereby upon energization the said magnet will offer the same sign of polarity to the contact-armature as the said second or attracting magnet normally offers the armature and whereby the contact-armature will be repelled at its free end to open or close the spark circuit.

18. In an electro-magnetic igniter, the combination with a plug and an electro-magnet, of an extended magnet core passing through the plug and insulated therefrom and extending into the combustion chamber, a second magnetic electrode surrounding the said extended magnetic electrode, a magnetic movable contact in series with the said electrodes whereby the said magnetic movable contact completes a magnetic and electric circuit across the electrodes, a second magnet having its poles in series relation with the said magnet core and the surrounding electrode and normally attracting the magnetic movable contact, and the said first named magnet in circuit with a distributer, whereby upon energization the said magnet will offer the same sign of polarity to the magnetic movable contact as the said second or attracting magnet normally offers the movable contact and whereby the said movable contact will be repelled at its free end to open or close the spark circuit passing through the winding of the said electro-magnet at spaced intervals whereby the magnetic flux permeating the core of the said electro-magnet will be reversed, and whereby the magnetic movable contact will be magnetically repelled from one of the electrodes to open the spark circuit.

19. In an electro-magnetic igniter, the combination with a plug and an electro-magnet, of an extended magnet core passing through the plug and insulated therefrom and extending into the combustion chamber, a second magnetic electrode surrounding the said extended magnetic electrode, a magnetic movable contact in series with the poles of the electrodes whereby the said movable contact completes a magnetic circuit, and means for reversing the magnetic flux at one of the poles whereby polarity of the same sign will be presented to each end of the magnetic movable contact and whereby the movable contact will be magnetically repulsed from one of the poles to open or close the spark circuit.

20. In an electro-magnetic igniter, in combination, a plug, a center electrode of magnetic metal extending through the insulating core of the plug and into the combustion chamber, an electro-magnet upon the plug, the core of said magnet fitting upon the said electrode, a holding magnet, the core of the holding magnet having metallic communication with the shell of the plug, the other ends of the magnet cores joined magnetically by a yoke, an armature-keeper comprising a movable electrode positioned across the said center electrode and an extension of the shell of the plug within the combustion chamber, said armature pivoted at one of its ends, a limiting post in the path of the armature, and an electric current passing through one of the magnet coils to attract the armature and through the other magnet coil in the same direction to magnetically repel the armature by the introduction of the same sign of polarity upon the armature, for the purpose herein set forth; and a terminal post connecting with the aforesaid center electrode between the end of the plug insulating core and the magnet upon the plug.

21. In an electro-magnetic igniter, in combination, a plug, a magnetic contact-armature in the combustion chamber, a holding magnet, one leg of which has magnetic communication with the center electrode of the said plug, the said contact-armature pivoted across the center electrode and the shell of the plug, the shell or body of the plug having magnetic communication with the other leg of the said magnet, whereby the said armature will be in series with the north and south poles of the magnet, and a solenoid upon the said center electrode wound and connected to present to the contact-armature, upon energization, magnetism of the same sign as presented to the armature by the holding magnet, and whereby the contact-armature will repel to open or close the spark circuit.

22. In an electro-magnetic igniter for internal combustion engines, in combination, a plug, a magnet upon the plug, one leg of the magnet passing through the plug and insulated therefrom and passing into the combustion chamber, the other leg of the magnet in contact with the metal shell of the plug, an armature-keeper pivoted across the poles of the formed magnet within the combustion chamber, coils of wire upon the magnet legs outside the plug, one of the coils normally energized to attract the armature-keeper and the second coil wound and connected to present to the armature-keeper, upon energization, magnetism of the same sign as presented to the armature normally by the holding magnet, and whereby the armature will repel to open or close the ignition circuit.

23. In an electro-magnetic igniter, the combination with a plug, of an electro-magnet and a second electro-magnet positioned upon the plug, a magnetic vibratory contact-armature within the engine cylinder, the poles of the said magnets having substantially metallic communication through the plug and with the armature, the said magnetic vibratory contact-armature mounted across the said pole extension members, a stationary contact upon one of the pole members, said armature normally held in engagement with said stationary contact under the influence of the first said electro-magnet, and repelled from the stationary contact through the introduction of like signs of polarity upon the armature when the said second electro-magnet is energized, for the purpose herein set forth.

24. In an electro-magnetic igniter, the combination with an electro-magnet and its armature, of a second electro-magnet, both magnets in magnetic communication with the armature, the first named magnet normally energized and attracting the armature and holding the armature in closed relation with a stationary contact, and the second said electro-magnet wound and connected to present to the armature, upon energization, at timed periods polarity of the same sign as normally presented by the first said electro-magnet, to cause the armature to be repulsed to open or close the ignition circuit.

25. In an electro-magnetic igniter, the combination with the casing, of two electro-magnets positioned in the upper portion thereof, a stationary contact, a vibratory contact member of magnetizable material constituting an armature mounted upon the core of one electro-magnet, one of the electro-magnets normally maintaining said contacts in closed relation, the other electro-magnet normally out of circuit and connected to offer to the armature at timed intervals a magnetic polarity of the same sign as the polarity the armature normally receives, whereby the armature will be magnetically repulsed and the sparking contacts separated.

26. In an electro-magnetic igniter, the combination with a plug and its insulating core, of a magnetic center electrode passing through the insulating core and into the combustion chamber, a sheathing of hard metal incasing the said magnetic electrode, an electro-magnet mounted upon the magnetic electrode outside the plug, a magnetic movable contact member comprising an armature-keeper within the combustion chamber, one end of the armature having communication with the said center electrode, a second metallic circuit magnetically connecting the other end of said armature with the second end or pole of the said electro-magnet, said magnet normally energized to attract the armature-keeper, a second winding upon the center electrode, or extension thereof, and a circuit closer designed to send an electric current at spaced intervals through the said second winding in a direction to repulse the magnetism generated by the first said electro-magnet, whereby the said armature-keeper will be magnetically repelled to open the ignition circuit.

27. In an electro-magnetic igniter, the combination with an electro-magnet and its armature, of a second electro-magnet, the armature in series-relation with the windings of the second electro-magnet, a stationary contact engaged thereby, the first electro-magnet normally maintaining said contacts in engagement, and the second electro-magnet offering the same sign of polarity to the armature as offered by the first electro-magnet, whereby the armature will be magnetically repelled to open and close the contacts intermittently.

28. In an electro-magnetic igniter, the combination with an electro-magnet, of a second electro-magnet, a magnetic movable contact, a stationary contact engaged thereby, the magnetic movable contact in series-relation with the windings of the second electro-magnet, the first electro-magnet normally maintaining said contacts in engagement, and the second electro-magnet offering the same sign of polarity to the magnetic movable contact as offered by the first electro-magnet, whereby the magnetic movable contact will be magnetically repelled to open and close the contacts intermittently.

29. In an electro-magnetic igniter, in combination, a plug, an electro-magnet, a second electro-magnet, an iron yoke magnetically connecting, but electrically insulated from, the cores of the magnets, terminal binding screws positioned upon and insulated from the said yoke, a contact-armature-keeper flexibly mounted in the combustion chamber, the opposite ends of the said magnet cores communicating respectively with the two ends of the contact-armature-keeper, the first said electro-magnet normally energized to attract the contact-keeper, the magnetic flux of the said magnet core having return magnetic circuit through the contact-keeper, through the core within the unenergized or second winding and through the iron yoke, and an electric current passing at timed intervals through the second or normally unenergized winding in a direction whereby the acquired magnetism in the core of said winding will be repulsed, and whereby magnetic flux of the same sign will be presented to the contact-armature-keeper as that given it by the first named or holding magnet and the armature repelled to open or close the ignition circuit; and wiring connections to adapt the igniter to various ignition systems.

30. In a device of the class described, the combination with a plug, of an electro-magnet and a second electro-magnet mounted upon the plug, the poles of said magnets respectively passing through the plug and into the engine cylinder and terminating in pole pieces, said pole pieces constituting the electrodes of the plug, a movable contact-arm of magnetizable material mounted across said pole pieces, said contact-arm constituting an armature, a limiting post in the path of the armature, a stationary contact upon one of the pole pieces, said movable contact-arm normally maintained across the said pole pieces to close the sparking circuit by the influence of said first named electro-magnet and repelled away from the stationary contact to open the sparking circuit by the influence of the second named electro-magnet upon energization of said magnet.

31. In an electro-magnetic igniter, the combination with the casing, of an electro-magnet and a second electro-magnet positioned in the upper portion thereof, a magnetic vibratory member, a contact point mounted upon the vibratory member and a stationary contact with which it is normally held in engagement under the influence of the first named electro-magnet, and repelled under the influence of the second named electro-magnet through a reversal in direction of magnetic flux presented to the magnetic vibratory member.

32. In an electro-magnetic igniter, the combination with an electro-magnet and a stationary contact, of a second electro-magnet, an armature pivoted upon the plug and positioned within the combustion chamber, a contact upon said armature, extended magnet poles passing through the plug and into the combustion chamber, an electric current passing through the coil of one magnet to hold the armature in closed relation with the stationary contact, and an electric current passing through the coil of the second magnet at spaced periods in a direction whereby magnetic flux will be presented to the armature opposing the direction of the magnetic flux presented the armature by the first said magnet, to open and close the ignition contacts intermittently.

33. In a device of the class described, in combination, a plug, a center magnetic electrode passing through the plug and insulated therefrom, an energized winding upon the said magnetic electrode, a magnetic movable contact pivoted across the said magnetic electrode and the shell of the plug, a second electro-magnet in communication with the shell and normally energized and attracting the magnetic movable contact into contact with the said center magnetic electrode to close the spark circuit, an auxiliary winding upon the said center magnetic electrode in series with the said second attracting electro-magnet winding whereby the said auxiliary winding will normally offer like magnetic polarity of the first said winding upon the center electrode and will normally counteract or neutralize the said first winding, and whereupon deënergization of the said auxiliary winding the first said winding will offer magnetic flux of the same sign to the magnetic movable contact as that normally offered by the said second or holding magnet, for the purpose herein set forth.

34. In an electro-magnetic igniter in combination, a holding magnet positioned across and electrically insulated from, the center electrodes of two spark plugs, two coils of insulated wire upon each of the two stems or legs of the magnet respectively, one coil upon each leg normally energized, a movable magnetic contact member within the combustion chamber, said member having position across the center electrode and the metal shell of the plug, said member acting as a keeper for the holding magnet, a circuit closing stop in the path of the movable contact member, the metal wall of the engine cylinders acting as a conductor of the magnetic lines of force and affording a metallic circuit for said lines of force, and an electric current energizing the remaining coil of wire upon one of the plugs at spaced intervals, whereby the polarity of the magnet leg within said coil will be reversed, and whereby the said reversing of polarity will cause the movable magnetic contact member of the said plug to magnetically repel to break and make the ignition circuit.

35. In an electro-magnetic igniter, the combination of a plug, a holding magnet, one of whose legs substantially connects to the center electrode of the said plug, the other leg substantially connecting to the center electrode of a second plug, a winding of wire upon the first leg, a second winding of wire upon the second leg, magnetic movable contact-armatures within the combustion chambers and extending from the said center electrodes respectively to the metal shell of each plug or extension therefrom, and an electric current passing through one of said coils at timed periods in a direction whereby the electrodes within said coil will acquire magnetism whose direction of travel is opposite to the direction of the magnetism imparted by the holding magnet, and whereby the said armature or armatures will be magnetically repelled to open or close the ignition circuit.

36. In an electro-magnetic igniter, in combination, a plug, a magnetic contact-armature within the combustion chamber, a holding magnet mounted upon the plug, one leg of which has magnetic communication with the center electrode of the said plug, the said contact-armature pivoted across the center electrode and the shell of the plug, the shell or body of the plug having magnetic communication with the other leg of the said magnet through a second plug, whereby the said armature will be in series with the north and south poles of the magnet, a solenoid upon the said center electrode, and an electric current passing through the said solenoid in a direction opposite to the direction of the acquired magnetism in the said center electrode, whereby the said center electrode will acquire the same polarity as the shell of the plug, and whereby the armature in series with the magnetic flux will have the same or like sign of magnetic polarity presented to it at both its ends and will be repelled from one of the poles to open or close the ignition circuit and a resistance unit to divide the current or balance the circuit as between the center electrode and the repelling solenoid.

37. In an electro-magnetic igniter, in combination, a plug, an electrode of magnetizable metal extending through the insulation of the plug and into the combustion chamber, a sheathing of nickel alloy incasing the electrode, an electro-magnet fitting upon the electrode outside the plug, a second magnet core forming a cylinder and surrounding the first said magnet and having metallic communication with the shell or body of the plug, the upper end of said cylindrical core being closed, a second solenoid surrounding the said last named core, an inclosing casing surrounding the said outer solenoid, a casing cover, terminal binding posts mounted upon the casing cover, a movable contact electrode of magnetizable metal within the combustion chamber, pivoted at one end, and positioned across the said center electrode and the shell of the plug, or an extension of the shell, a member in the path of the movable contact to limit the movement of the said movable contact, an electric current normally energizing one of the said solenoids, and a current energizing the other solenoid at timed periods, the current traveling through both coils in the same direction, whereby the same sign of magnetic polarity will be presented to the magnetic movable contact at both its ends and whereby the movable contact will be magnetically repelled at its free end to open the spark circuit and wiring connections to adapt the igniter to various ignition systems.

38. In an electro-magnetic igniter a plug, a core of magnetizable metal extending above the plug, through the insulation of the plug and into the combustion chamber, a solenoid upon the core above the plug, a second core surrounding the said solenoid, a second solenoid surrounding the said last named core, the first said core screwing into insulation designed to insulate the cores from each other and prevent the passage of heat and gases, the said second or outer core screwing into the insulating core of the plug, the first named or center core terminating as a stationary contact member within the combustion chamber, a contact point upon said core termination, an armature of magnetizable metal pivoted to a section of the outer core, said armature acting as a movable electrode, fiber end pieces upon the ends of the solenoids, a fiber casing around the outer solenoid the inner core terminating in a binding screw an insulated binding screw, one wire of the inner solenoid connecting with the inner core, one wire of the outer solenoid connecting with a grounding screw, one wire of each solenoid connecting with the aforesaid insulated binding screw, a non-magnetic post or block screwed to the end of the inner core and having position between the core and the binding screw, an electric current passing through the turns of the outer solenoid whereby the armature will be magnetized and seek and connect with the inner core, a spark current passing at timed periods through the said cores, and a current passing at timed periods through the turns of the inner solenoid in a direction whereby the same or like magnetic polarity will be offered the armature as it normally possesses, and whereby the armature will be magnetically repelled to open the spark circuit.

39. In an electro-magnetic igniter, the combination with an electro-magnet, and its armature, of an extended magnet core lying between one end of the magnet coil and the armature, insulation surrounding the extended core, said core extending into the combustion chamber, the aforesaid armature acting as a contact arm, the said electro-magnet normally attracting the contact arm in closed relation with the stationary contact, and a second electro-magnet having its core insulated and extending into the combustion chamber in proximity to the said contact arm, and an electric current passing through the second said magnet coil at timed intervals in a direction whereby the same or like sign of polarity will be presented to the armature from each of said magnets, and whereby the armature will be magnetically repelled to open the sparking circuit.

40. In an electro-magnetic igniter, in combination, a plug, a stationary contact, a movable contact member of magnetizable material comprising an armature, a pair of cores of magnetizable metal extending through the plug and insulated therefrom and from each other, said cores entering the combustion chamber, one of them forming a pivot post for the armature, the other acting as the stationary contact; the other ends of said cores extending out of and above the plug, an angle in the cores upon leaving the plug, the cores within the plug and combustion chamber incased by a sheathing of nickel alloy, two detachable magnets designed to fit onto the cores respectively, the solenoids of the magnets preferably of different magnetizing strengths, one magnet having upon its upper end a thick insulating end piece forming an insulation over the end of the core, an iron cross-piece secured to one core and pressing upon the said insulating end piece, terminal binding posts mounted upon the said cross-piece; the stationary contact core having an extending or pinched-out portion forming a contact to engage with the armature, the armature having a magnetic or non-magnetic pivot clasp securely attached to it, a recess or groove in the pivot core, an armature limiting post in the path of the armature; and an electric current passing through the solenoids in the same direction with reference to their respective ends, whereby the said armature will repel away from the magnetic pole piece at its free end to open the ignition circuit.

41. The combination with a make and break igniter including a body, a movable and a stationary electrode, of a pair of metallic cores extending through the body and insulated therefrom and from each other, coils of insulated wire upon one end of the cores respectively, the other ends of the cores extending into the combustion chamber and into proximity with said electrodes, one of said coils normally energized and its extended core attracting the movable electrode, the other coil, upon energization by a current passing through it in the same direction as the current passing through the first said coil, magnetizing its core with the same direction of magnetism with reference to the respective core ends, and whereby the movable electrode will be presented with the same sign of magnetic polarity from each extended core and will magnetically repel from one of the cores to open the ignition circuit; and a circuit-closing contact stop in the path of the movable electrode.

42. The combination with a make and break igniter including a body, a movable and a stationary electrode, of a pair of metallic cores of magnetizable material extending through the body and insulated therefrom and from each other, coils of insulated wire upon the cores, an iron yoke across the ends of the said cores and electrically insulated from one or both of them, the other ends of the cores extending into the combustion chamber and into proximity with said electrodes whereby the magnetization of one of the cores will cause it to attract the movable electrode member and normally maintain said member in closed relation with the stationary electrode, and whereby the magnetization of the second core will offer the same or like sign of magnetic polarity to the movable electrode as that given it by the first said magnetized core, and whereby said movable electrode will be magnetically repelled to intermittently open the ignition circuit, and a member in the path of the movable electrode to limit the movement of the said electrode; and a resistance unit in series with one of the said metallic cores and the current terminal on the plug feeding the winding of the said second or repelling magnet.

43. In an electro-magnetic igniter, a pair of stems comprised wholly or partially of magnetizable metal, said stems passing through the insulating core of the plug, the stems having solenoids upon them, said stems or legs extending into the combustion chamber, the outward ends of the stems or legs having an iron cross-piece touching one or both of them, the ends of the legs within the combustion chamber having their magnetic field or fields joined by an armature, said armature acting as a movable contact, a stationary contact, an electric current normally energizing one of the solenoids and its stem or leg, an electric current energizing the second solenoid at timed periods whereby the same or like sign of magnetic polarity will be induced upon the armature by the said second stem or leg as that normally induced upon said armature by the first leg or stem, and whereby the armature will be magnetically repelled from one of said legs or stems to open or close the sparking circuit; and a resistance unit upon the igniter to balance the circuits.

44. In an electro-magnetic igniter, a plug, a pair of cores of magnetizable metal extending through the insulating core of the plug and into the combustion chamber, an armature of magnetizable metal having position in the combustion chamber, said armature pivoted at one of its ends to one of the said cores, the armature acting as a movable contact, an armature limiting post, the second metal core acting as a stationary contact, the said metal cores extending upward through and out of the insulating core of the plug, an angle in the cores upon leaving the plug solenoids of like or different strength and resistance upon the metal cores respectively, said solenoids slipping onto the cores, means for securing the solenoids onto the cores, fiber end pieces at the ends of the solenoids, casings inclosing the solenoids, binding screws upon the ends of the cores respectively, a wire from one of the solenoids connecting with one of the cores, a wire from one or both of the solenoids grounded, a metal grounding strip secured between the shell of the plug and its insulating core, a cross-piece yoke connecting with one of the said metal cores, said yoke approaching but not touching the other said core, an electric current constantly passing through the windings of one of the solenoids whereby the armature will be permeated with magnetic lines of force and will seek and connect at its free end with the adjacent metal core, a spark producing current directed through the said metal cores at timed periods, and a current directed through the windings of the other solenoid at timed periods, whereby the introduction of like magnetic polarities at the respective poles of the magnet cores will cause the free end of the armature to be magnetically repelled from one of the poles to open the sparking circuit; and a resistance unit in series with one of the cores and the current terminal upon the plug which feeds the repelling solenoid.

GEORGE H. TILESTON.